June 30, 1953     O. STASSINOS     2,643,395
EMERGENCY STRETCHER
Filed Sept. 25, 1950     2 Sheets-Sheet 1
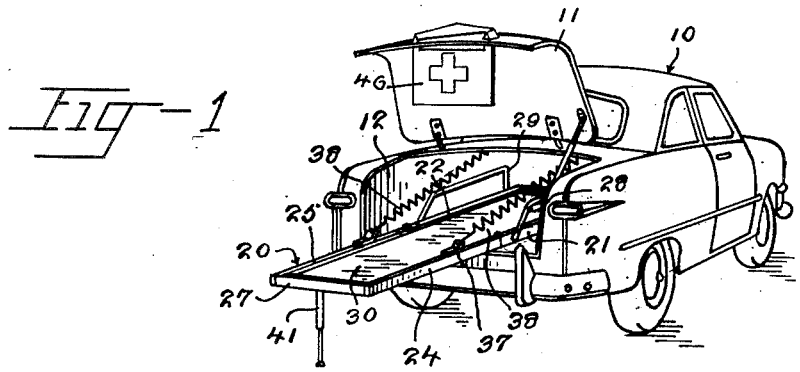
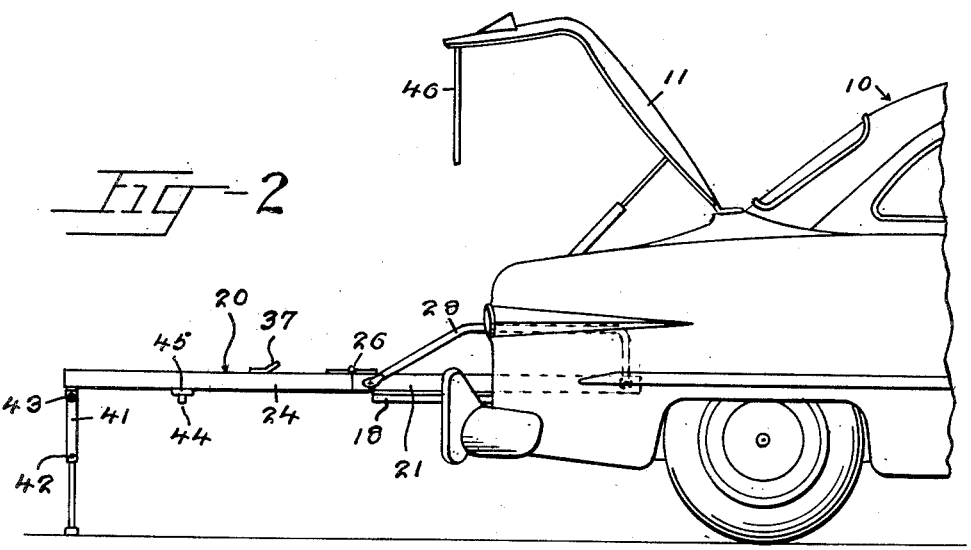
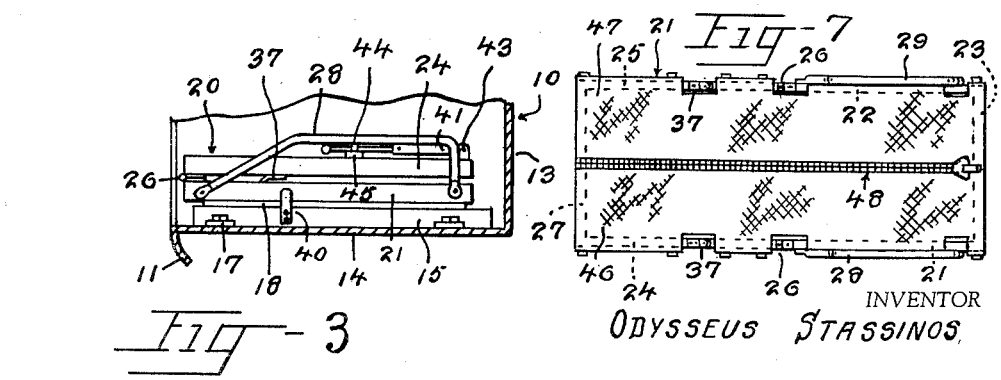
INVENTOR
ODYSSEUS STASSINOS
BY *Victor J. Evans & Co.*
ATTORNEYS

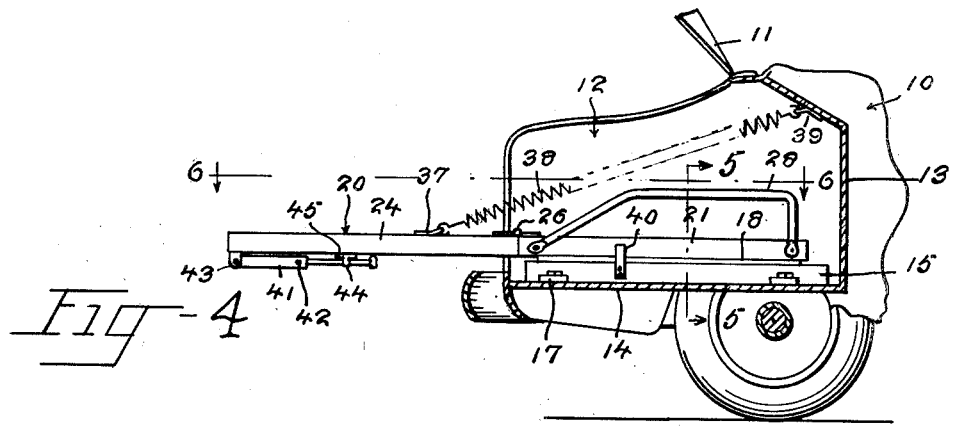
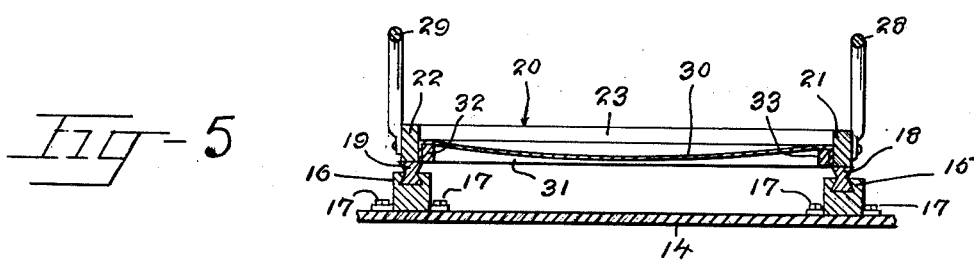
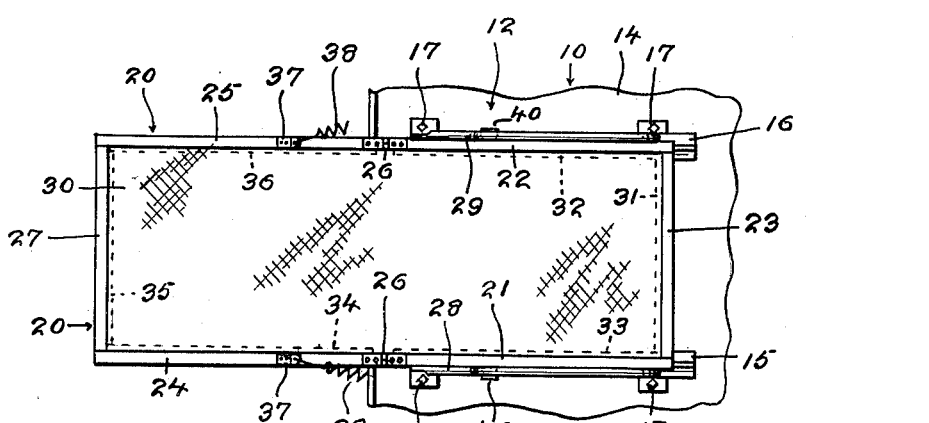

Patented June 30, 1953

2,643,395

UNITED STATES PATENT OFFICE 2,643,395

EMERGENCY STRETCHER

Odysseus Stassinos, Charlotte, N. C.

Application September 25, 1950, Serial No. 186,660

3 Claims. (Cl. 5—119)

This invention relates to an emergency stretcher which is adapted to be carried and mounted in the trunk of an automobile.

The object of the invention is to provide a stretcher for positioning in the trunk of an automobile, so that police, firemen, doctors, Red Cross personnel and the like will have a stretcher readily available in case a stretcher is required.

Another object of the invention is to provide a stretcher which can be conveniently stored in the trunk compartment of an automobile when not being used, the stretcher being readily extended to operative position in case of an emergency.

A further object of the invention is to provide an emergency stretcher which is extremely simple and inexpensive to manufacture.

Other objects and advantages will be apparent during the course of the following description.

In the accompanying drawings forming a part of this application, and in which like numerals are used to designate like parts throughout the same:

Figure 1 is a rear perspective view of an automobile, showing the stretcher of the present invention disposed in the trunk compartment thereof;

Figure 2 is a partial side elevational view of the rear portion of the automobile of Figure 1, looking at the right-hand side thereof, and with the stretcher in extended position;

Figure 3 is a side elevational view, with parts broken away and in section, showing the stretcher of the present invention in folded or carrying position in the trunk compartment;

Figure 4 is a side elevational view, with parts broken away and in section, and showing the stretcher of the present invention in extended position as when the patient is being carried on the stretcher;

Figure 5 is a sectional view taken on the line 5—5 of Figure 4;

Figure 6 is a sectional view taken on the line 6—6 of Figure 4;

Figure 7 is a modified plan view, showing a canvas bag attached to the stretcher.

Referring in detail to Figures 1 through 6 of the drawings, the numeral 10 designates an automobile, and the automobile 10 includes a trunk lid 11 which is adapted to be moved into and out of closing relation with respect to the trunk compartment 12. The automobile 10 further includes an end wall 13, Figure 4, and a horizontally disposed floor 14.

Extending along the floor 14 and secured thereto by suitable securing elements, such as screws 17, is a pair of spaced parallel, horizontally disposed, female, dovetailed tracks 15 and 16, Figure 5. Slidably mounted in the pair of female, dovetailed tracks 15 and 16 is a pair of male, dovetailed tracks 18 and 19. The male dovetailed tracks 18 and 19 are adapted to be slid or moved in the female dovetailed tracks 15 and 16, so that the stretcher 20 can be moved forwardly or rearwardly as desired. The stretcher of the present invention is indicated broadly by the numeral 20.

Secured to the male dovetailed tracks 18 and 19 are a pair of frame members 21 and 22, Figure 6, and a crosspiece or cross member 23 extends between one end of the frame members 21 and 22 and is secured thereto. Hinges 26 serve to hingedly connect the frame members 24 and 25 to the frame members 21 and 22. A crosspiece or cross member 27 extends between the free ends of the frame members 24 and 25 and is secured thereto in any suitable manner.

Secured to the frame members 21 and 22 in any suitable manner is a pair of hand rails 28 and 29, Figures 1, 5 and 6. The hand rails 28 and 29 are adapted to be used in facilitating the movement of the stretcher into and out of the trunk compartment 12. The hand rails 28 and 29 can also be used to help prevent patients from rolling off of the stretcher 20.

Extending between the frame members 21, 22, 23, 24 and 25 is a canvas bottom 30. The canvas bottom 30 is adapted to provide a comfortable support for the patient, and the canvas bottom 30 is held in its proper position by means of supporting pieces 31, 32, 33, 34, 35 and 36, Figure 6. Secured to the frame members 24 and 25 are spring perches 37, and coil springs or tension springs 38 each have an end secured or connected to the spring perches 37. The other ends of the tension springs 38 are connected to spring perches 39 which are mounted on the rear wall 13 of the trunk compartment 12, Figure 4. Tension springs 38 provide a resilient mounting for the frame members 24 and 25, and these springs also hold the emergency stretcher 20 in a forward position when the patient is being moved to the destination.

Mounted on the female dovetailed tracks 15 and 16 in any suitable manner is a bar 40, Figures 3 and 4, and the bar 40 serves as a stop member to limit outward movement of the stretcher 20. Thus, the bar 40 will strike or engage the right-hand, downwardly projecting portion of the hand rail 28 to thereby restrict or limit outward movement of the stretcher 20.

Referring to Figures 1, 2, 3 and 4 of the drawings, there is shown a telescoping stand indicated by the numeral 41. The stand 41 is provided with a set screw 42, so that the height of the telescoping stand can be maintained immobile in its various adjusted positions. The stand 41 is pivotally connected by a pin 43 to the cross member 27, and the stand is adapted to be stored or folded into an out-of-the-way position when the vehicle is in motion. Thus, a spring clip 44 is dependingly supported by a crossbar 45, and the cross bar 45 is fixedly mounted on the lower surfaces of the frame members 24 and 25, the spring clip 44 adapted to selectively hold or receive therein the stand 41, Figure 4.

Pivotally mounted on the trunk lid 11 is a warning flag 46, Figure 1. The warning flag 46 can be locked in an out-of-the-way position when the lid 11 is in its closed or down position, and the warning flag 46 may be lowered when the trunk lid 11 is raised, as when a patient is being transported in the vehicle.

Referring to Figure 3 of the drawings, it will be seen that the emergency stretcher of the present invention can be folded into the trunk compartment 12 of the automobile 10 when the stretcher is not being used. To move the emergency stretcher into the trunk compartment 12, the frame members 24 and 25 are lifted and rotated 180°, whereby the spring perches 37 will rest on the frame members 21 and 22. Then, the stretcher 20 can be slid or moved forwardly or to the right, Figures 2 and 3. The trunk lid 11 may then be lowered and the emergency stretcher 20 will be conveniently stored away until needed.

Referring to Figure 7 of the drawings, there is shown a modified assembly which includes a pair of canvas strips or flaps 46 and 47. These canvas strips 46 and 47 may be secured to the frame members 24 and 25 in any suitable manner, and a slide fastener 48 serves to detachably connect the free ends of the strips 46 and 47 together. Thus, a bag is provided whereby the patient on the stretcher 20 will be protected or covered from adverse weather conditions, and also the patient will be prevented from accidentally falling off of the stretcher during movement of the vehicle. The slide fastener 48 can be opened when the patient is to be supported or positioned initially on the stretcher 20.

From the foregoing, it is apparent that an emergency stretcher has been provided which can be readily moved into and out of operative position when needed. When the stretcher is to be used, the stretcher 20 is in the position shown in Figures 1, 2 and 6. Thus, the stand 41 supports the outer end of the stretcher 20 so that a patient can be conveniently moved onto the stretcher. Then, when the patient is to be transported to a hospital or the like, the stand 41 is pivoted to the position shown in Figure 4, so that the vehicle can be driven to the desired location, with the patient being supported on the stretcher 20. When the stretcher 20 is not being used, it can be folded or moved to the position shown in Figure 3, so that the trunk lid 11 can be lowered, whereby there will be no interference with normal operation of the vehicle.

The stretcher of the present invention is especially suitable for automobiles that are used by police, firemen, doctors, Red Cross personnel and the like. Thus, in the event that a policeman arrives before the ambulance arrives on the scene of an accident, the policeman having the emergency stretcher of the present invention in the trunk of the automobile which he is driving can transport the patient to a hospital.

I claim:

1. In combination, an automobile including a body, having a trunk compartment comprising a floor, a trunk lid hingedly connected to said body, a pair of spaced parallel horizontally disposed female dovetailed tracks secured to said floor, a male dovetailed track slidably connected to each of said female dovetailed tracks, a rectangular stretcher including a pair of frame members secured to said male dovetailed tracks, cross members extending between said frame members and secured thereto, vertically disposed hand rails secured to said frame members for moving said stretcher, a canvas bottom extending between said cross members and frame members and secured thereto, and a bar secured to one of said female dovetailed tracks for engaging said hand rail to limit sliding movement of said stretcher out of said trunk compartment.

2. In combination, an automobile including a body, having a trunk compartment comprising a floor, a trunk lid hingedly connected to said body, a pair of spaced parallel horizontally disposed female dovetailed tracks secured to said floor, a male dovetailed track slidably connected to each of said female dovetailed tracks, a rectangular stretcher including a pair of frame members secured to said male dovetailed tracks, cross members extending between said frame members for moving said stretcher, a canvas bottom extending between said cross members and frame members and secured thereto, and a bar secured to one of said female dovetailed tracks for engaging said hand rail to limit sliding movement of said stretcher out of said trunk compartment, and a telescopic vertically disposed stand pivotally connected to said stretcher.

3. In combination, an automobile including a body, having a trunk compartment comprising a floor, a trunk lid hingedly connected to said body, a pair of parallel female dovetailed tracks secured to said floor, a male dovetailed track slidably connected to each of said female dovetailed tracks, a stretcher including frame members secured to said male dovetailed tracks, cross members extending between said frame members and secured thereto, hand rails secured to said frame members for moving said stretcher, a bottom extending between said cross members and frame members and secured thereto, and a bar secured to said female dovetailed tracks for engaging said hand rail to limit sliding movement of said stretcher out of said trunk compartment.

ODYSSEUS STASSINOS.

References Cited in the file of this patent

UNITED STATES PATENTS

| Number | Name | Date |
|---|---|---|
| 712,910 | Costa | Nov. 4, 1902 |
| 1,150,106 | Ericson | Aug. 17, 1915 |
| 1,576,919 | Lowery | Mar. 16, 1926 |
| 2,138,826 | Arntzen | Dec. 6, 1938 |
| 2,327,680 | Tavaris | Aug. 24, 1943 |
| 2,451,275 | Cercownay | Oct. 12, 1948 |

FOREIGN PATENTS

| Number | Country | Date |
|---|---|---|
| 195,773 | Switzerland | June 16, 1938 |